United States Patent [19]

Washida et al.

[11] 4,184,077

[45] Jan. 15, 1980

[54] INPUT SCREEN OF AN IMAGE INTENSIFIER

[75] Inventors: Hiroshi Washida, Kawasaki; Tomiya Sonoda, Machida, both of Japan

[73] Assignee: Tokyo Shibaura Electric Co., Ltd., Kawasaki, Japan

[21] Appl. No.: 794,025

[22] Filed: May 5, 1977

[30] Foreign Application Priority Data

| | | | |
|---|---|---|---|
| May 11, 1976 | [JP] | Japan | 52-52840 |
| Aug. 30, 1976 | [JP] | Japan | 52-102690 |
| Nov. 8, 1976 | [JP] | Japan | 52-133181 |

[51] Int. Cl.$^2$ .......... G01J 1/58

[52] U.S. Cl. .......... 250/483; 250/486

[58] Field of Search .......... 250/483, 486, 487, 488, 250/213 VT; 427/157, 158

[56] References Cited

U.S. PATENT DOCUMENTS

| | | | |
|---|---|---|---|
| 3,825,763 | 7/1974 | Lisgtemnberg et al. | 250/486 |
| 4,011,454 | 3/1977 | Lubowski et al. | 250/486 |

*Primary Examiner*—Bruce C. Anderson

*Attorney, Agent, or Firm*—Cushman, Darby & Cushman

[57] ABSTRACT

An input screen of an image intensifier comprises an aluminium substrate with a mosaic surface made by anodizing, sealing process and heat treatment and a fluorescent layer deposited on the mosaic surface of the substrate and includes a large number of columnar blocks defined by the cracks extending from the substrate.

8 Claims, 7 Drawing Figures

INPUT SCREEN OF AN IMAGE INTENSIFIER

This invention relates to an input screen of an image intensifier comprising a substrate permeable to rediations such as X- and γ-rays and a fluorescent layer mounted on the substrate to be excited by said radiations.

An image intensifier provided with an input screen is demanded to have a high resolution. To date, however, no image intensifier has been proposed which carries out a desired high resolution. A decline in the resolution is ascribed to the fact that lights generated in a fluorescent layer are scattered in various directions to advance transversely in the fluorescent layer and to travel toward the substrate and randomly reflected therefrom, resulting in an extremely spread or blurred image when reaching a photocathode of the screen.

A known process (disclosed in, for example, the U.S. Pat. No. 3,825,763) of preventing light beams from being carried transversely to the fluorescent layer is purposely to form cracks extending in the thickness direction of the fluorescent layer. This process comprises the steps of thermally depositing cesium iodide on a substrate of aluminium to form a fluorescent layer, subjecting both elements to heat treatment, and purposely producing cracks in the fluorescent layer by a difference between the thermal expansion coefficients of both elements. Even a fluroescent layer thus formed still presents difficulties in attaining a sufficiently high resolution. The reason why the difficulty remains is that it is impossible to let the cracks to extend in the narrow form throughout the thickness length of a fluorescent layer from the photocathode side to the substrate side and consequently, though light beams are prevented by cracks from traveling transversely in the fluorescent layer in the proximity of the photocathode, yet light beams tend to spread transversely in the fluorescent layer in the neighborhood of the substrate to which cracks do not extend.

It is accordingly the object of this invention to provide an input screen for an image intensifier having a sufficiently high resolution, and more particularly to an input screen provided with a fluorescent layer capable of efficiently conducting excited lights to a photocathode on said fluorescent layer.

According to an aspect of this invention, there is provided an input screen of an image intensifier for converting incoming radiations into electrons, comprising an aluminium substrate provided with a mosaic surface prepared by anodizing, sealing process and heat treatment, said mosaic surface including a large number of narrow grooves and numerous islands defined by said narrow grooves; a fluorescent layer formed on the aluminium substrate and having cracks above the narrow grooves and a large number of columnar blocks defined by the cracks which are arranged parallel with each other; and a photocathode mounted on said fluorescent layer.

With the image intensifier input screen of this invention, the width W and depth D of the substrate grooves and the thickness T of the fluorescent layer are preferred to have such measurements as satisfy the following equations:

$$T=AW+B$$

$$D \geqq W/2$$

where $A=30$; $-65\mu \leqq B \leqq 45\mu$; $T \geqq 50\mu$; and $1\mu \leqq W \leqq 15\mu$.

This invention can be more fully understood from the following detailed description when taken in conjunction with the accompanying drawings, in which.

Figure 6:
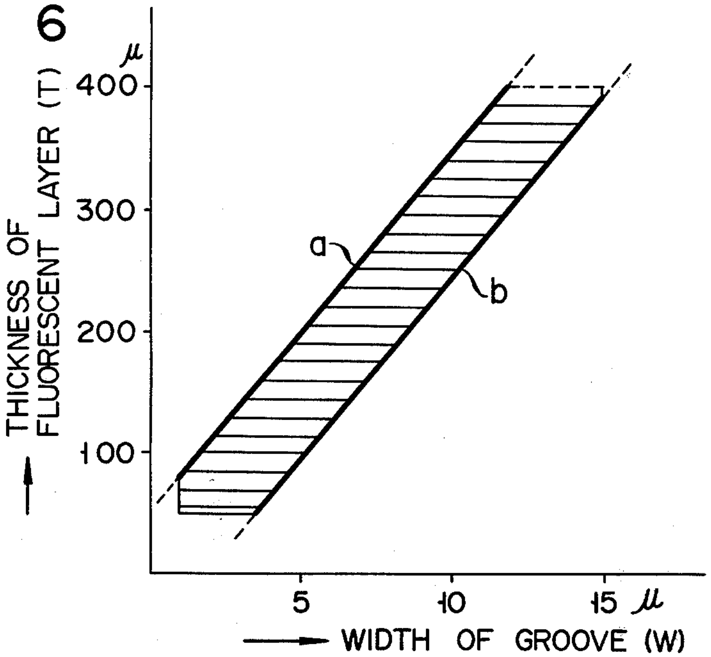
Figure 7:
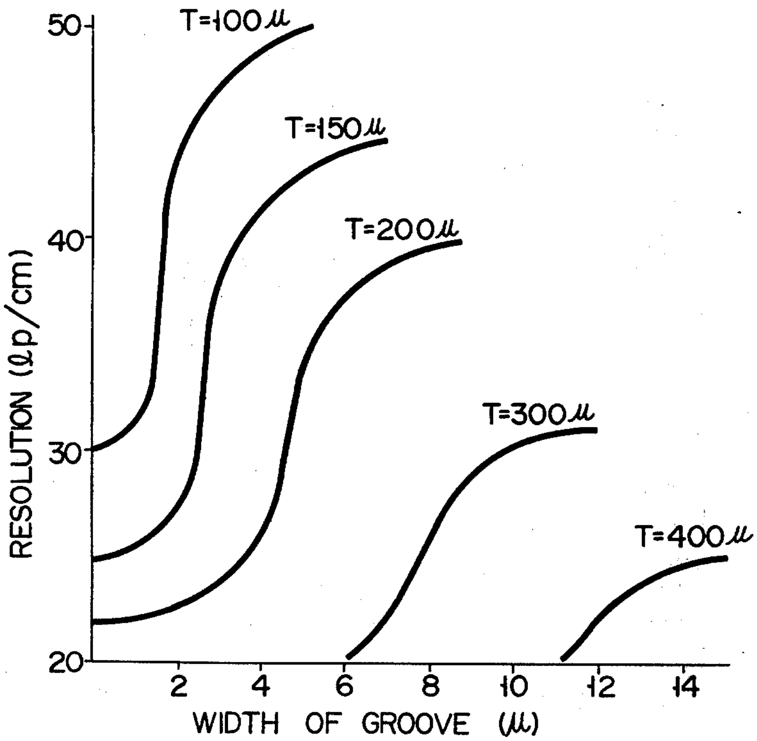

FIG. 6 is a graph showing the range of a preferred relationship between the width of the grooves in the mosaic surface of a substrate and the thickness of a fluorescent layer; and FIG. 7 is a graph for indicating the results of determining the relationship between the width of narrow grooves defining islands and the resolving power of an input screen with the thickness of a fluorescent layer used as a parameter.

There will now be described by reference to the accompanying drawings an image intensifier input screen according to one embodiment of this invention.

Figure 1:
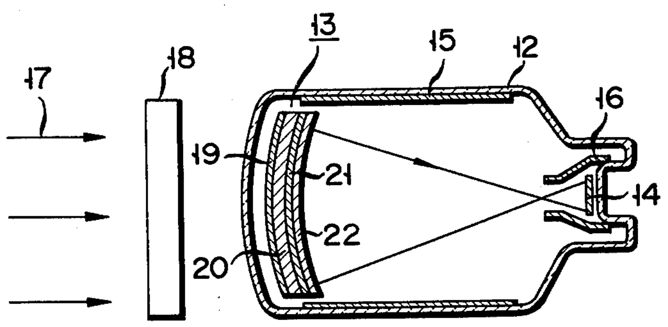
FIG. 1 is a schematic sectional view of an X-ray image intensifier provided with an input screen according to one embodiment of this invention.

Referring to FIG. 1 schematically showing the whole of an X-ray image intensifier, a glass envelope 12 contains an input screen 13 so shaped as to conform to the convex front end face of the glass envelope 12 and an output screen 14 lying near the rear end face of the glass envelope 12. Provided by the conventional process between the input screen 13 and output screen 14 are a focussing electrode 15 and acceleration electrode 16 respectively to focus electron beams from the input screen 13 and accelerate said electron beams. The input screen 13 comprises a substrate 19 formed of an aluminium layer permeable to X-rays; a fluorescent layer 20 formed on the inner surface of the substrate 19 and excited by X-rays passing through the substrate to emit visible light; a barrier layer 21 mounted on the fluorescent layer 20 of a material chemically stable and permeable to light issued from the fluorescent layer 20; and a photocathode 22 deposited on the barrier layer 21. Referring to FIG. 1, referential numeral 17 denotes X-rays and 18 shows an object exposed to X-rays.

Figure 2:
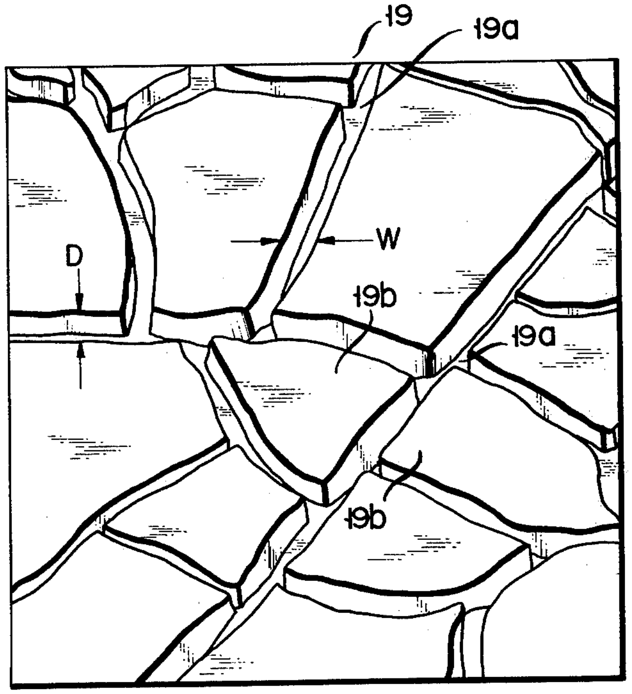
FIG. 2 is an enlarged oblique view of an aluminium substrate provided with a mosaic surface used with the input screen of FIG. 1.
Figure 3:
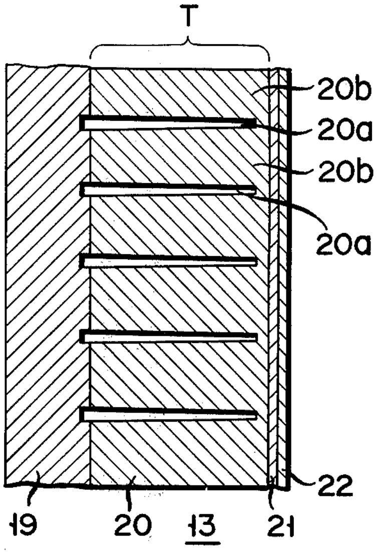
FIGS. 3, 4 and 5 are enlarged sectional views of input screens according to various embodiments of the invention.

There will now be described the detailed construction of the input screen 13 together with the method of manufacturing the same with reference to FIGS. 2 and 3. One side of an aluminium sheet 0.5 micron thick is subjected to anodizing and then the sealing process of minute pores formed therein and heat treatment, thereby causing the treated side of the aluminium sheet to present a mosaic pattern formed of a large number of islands 19*b* irregularly defined by narrow grooves 19*a*. That is, the aluminium sheet is subjected to anodizing for about one hour in a 3% oxalic acid solution by introducing current of 1 A/dm$^2$, thereby rendering the surface of the aluminium sheet porous. Thereafter, the aluminium sheet is washed with water and then dipped in boiling water for about one hour for the swelling of water of crystallization contained in the numerous pores, that is, undergoes the so-called sealing process. The oxidized aluminum sheet containing water of crystallization is thermally treated for several minutes at a higher temperature than about 250° C. to evaporate the water of crystallization from the pores. As the result, the aluminium sheet forming the substrate 19 presents a mosaic surface. As microscopically measured, the mosaic surface of the substrate 19 included narrow grooves 19*a* having a width W of about 3 to 7 microns and a depth D of about 10 microns and islands 19*b*, most of which had a maximum diameter of 50 to 100 microns (FIG. 2).

Next, a fluorescent layer 20 is formed in such a manner that cesium iodide is thermally deposited in vacuum with a thickness of about 150 microns on the mosaic surface of the substrate 19 at the rate of 3 to 6 microns/-min (5 microns/min in this embodiment) with the substrate 19 maintained at a temperature ranging between room temperature and 150° C. (100° C. in this embodiment). The fluorescent layer 20 includes a large number of columnar blocks 20*b* about 50 to 100 microns in diameter which are defined by cracks 20*a* formed above the grooves 19*a* of the substrate 19 and arranged parallel to one another on the surface of the substrate 19. Where a fluorescent layer 20 of cesium iodide is thermally deposited on the mosaic surface of the substrate 19, then the most of cesium is deposited on the islands 19*b* to form columnar blocks because the fluorescent layer is vertically grown on the islands in the crystalline form. While the cesium iodide is thermally deposited on the mosaic surface of the substrate 19, crystals of the cesium iodide are exposed to the heat from the substrate 19 and heat radiated from a boat used as an evaporation source. The cesium iodide crystals constituting the columnar blocks 20*b* gradually grow to have large diameters, so that the cracks 20*a* are progressively rendered narrower as the thermal deposition of the cesium iodide proceeds. Where the fluorescent layer 20 is formed thick, cracks sometimes disappear in the upper portion of said layer. Even in this case, however, gaps or void spaces arise above the cracks 20*a* by stresses exerted thereby. As the result, the columnar blocks 20*b* of the cesium iodide fluorescent layer are separated from each other by said gaps and cracks 20*a*.

To widen the grooves 19*a* of the aluminium substrate 19 in the above-mentioned process, it is advised to prolong the sealing time, for example, to 6 to 10 hours and or repeat the cycle of sealing and heat treatment. This procedure enables the grooves 19*a* to be widened to 7 microns at maximum. Further, if the sealing operation is conducted in boiling water containing about 2 g/l of lithium chloride or cesium chloride, then the grooves 19*a* can be widened to 7 microns by one step. Moreover, repetition of the cycle of sealing and heat treatment can widen the grooves 19*a* up to 15 microns. The grooves 19*a* can also be widened by carrying out the sealing operation in boiling water mixed with, for example, sodium carbonate, ammonia, or sodium hydroxide to have a pH value of about 11.

If, in case cesium iodide is used as fluorescent material, the substrate 19 is maintained at lower temperature than 150° C. while the cesium iodide is thermally deposited, then cracks 20*a* are less liable to disappear.

Figure 4:
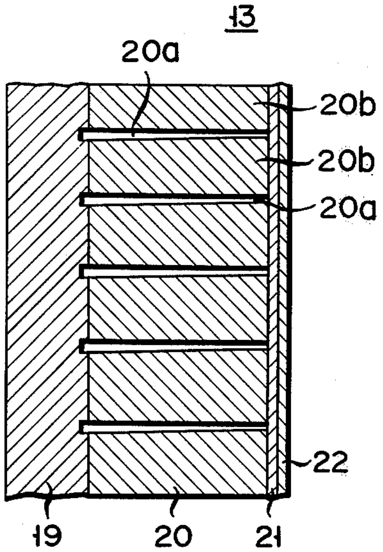

Aluminium or titanium is thermally deposited on the surface of the fluorescent layer 20 prepared by the abovementioned process to provide a conductive barrier layer 21. Further, the photocathode 22 is deposited on said barrier layer 21, thereby finally providing an input screen 13.

Where the barrier layer 21 is thermally deposited on the fluorescent layer 20 having cracks 20*a* formed up to the upper surface of said layer 20, then cracks are likely to be also produced on the barrier layer 21. To avoid the occurrence of this undesirable event, it is advised to take means for substantially preventing cracks 20*a* from being formed on the upper surface of the fluorescent layer 20. Namely, cracks 20*a*, if grown, should preferably be filled up by heating the upper surface of the fluorescent layer 20 and then scattering, for example, cesium iodide constituting said fluorescent layer 20 on to the cracks 20*a*. If, in case cracks 20*a* appear on the upper surface of the fluorescent layer 20, care is taken thermally to deposit the barrier layer 21 on the fluorescent layer 20 in an olique direction, then the barrier layer 21 is little likely to be cracked. FIG. 3 shows the case where the upper surface of the fluorescent layer 20 is free from cracks 20*a*, and FIG. 4 shows the case where cracks 20*a* extend up to the upper surface of the fluorescent layer 20. Where cracks 20*a* are appeared in the upper surface of the fluorescent layer 20, it is necessary to prepare the barrier layer 21 of conductive material. Where, however, the upper surface of the fluorescent layer 20 is free from cracks 20*a*, then it is possible to form the barrier layer 21 of insulating material.

With the fluorescent layer 20 formed as described above, the columnar blocks 20*b* are separated from each other by narrow cracks 20*a*. Therefore, the lights generated in the fluorescent layer 20 which are directed to the photocathode are totally reflected on the lateral walls of the columnar blocks 20*b* and proceed towards said photocathode without scattering transversely and release photoelectrons at the photocathode. On the other hand, the lights excited in the fluorescent layer 20 which are carried toward the substrate 19 are totally reflected on the lateral surfaces of the columnar blocks 20*b* and the surface of the substrate 19 and also proceed towards the photocathode.

As experimentally determined, the image intensifier input screen of this invention comprising an aluminium substrate presenting a mosaic surface indicated a remarkably improved resolution of 45 lp/cm as compared wih that of the conventional input screen of 28 lp/cm.

Figure 5:
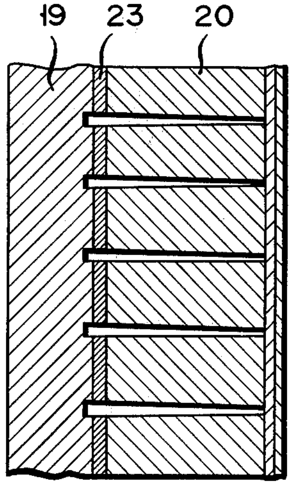

With an input screen according to another embodiment of FIG. 5, a specular surface is provided on mosaic surface. Namely, an aluminium layer 23, for example, is thermally deposited with a thickness of about 2,000 Å on the aluminium substrate 19 having a mosaic surface formed by the abovementioned process. The fluorescent layer 20 is evaporated on said aluminium layer 23. With the input screen according to the embodiment of FIG. 5, the aliuminium layer 23 acts as reflector. Therefore, lights reaching this aluminium layer 23 are reflected in a larger amount, enabling an image to have a 20% higher brightness than is possible with the foregoing embodiments. Provision of the aluminium layer 23 has further advantage that the substrate 19 and fluorescent layer 20 can be bonded together more firmly.

Where the above-mentioned aluminium layer 23 is formed on the substrate 19 with as small a thickness as, for example, 1,000 Å, then said aluminium layer 23 serves as a light-absorbing layer to absorb light conducted thereto. Though, in this case, an image can not be expected to have an increased brightness, yet the input screen is more improved in a resolution. This improved resolution may be ascribed to the following fact. Even where a large number of columnar blocks 20*b* are separaed from each other by cracks formed in the fluorescent layer 20 as in the preceding embodiment, some of the lights conducted to the lateral surfaces of the columnar blocks 20*b* pass through said lateral surfaces, depending on the angle of incidence at which the lights are brought to the lateral surfaces. However, the above-mentioned thin aluminium layer 23 acting as a light absorber substantially prevents lights from reflecting on the substrate 19, thereby prominently decreasing an amount of lights entering the lateral walls of the columnar blocks **20*b***.

With the input screen of this invention, the width W and depth D of the grooves **19*a* formed in the mosaic surface of the aluminium substrate 19 and the thickness T of the fluorescent layer 20** have a close interrelationship with respect to the resolution of the input screen. The undermentioned conditions have been experimentally determined to be optimum.

$$T=AW+B$$

$$D\geqq \tfrac{1}{2}W$$

where $A=30$; $-65\mu\leqq B\leqq 45\mu$; $T\geqq 50\mu$; and $1\mu\leqq W\leqq 15\mu$.

FIG. 6 is a diagram showing the relationship between the width W of the grooves **20*a* formed in the mosaic surface of the substrate 19 and the thickness T of the fluorescent layer 20**. The width W is plotted on the abscissa and the thickness T is shown on the ordinate. The preferred measurements of the width W and thickness T are determined to face within a range indicated by the hatching. This hatching area is defined by line a (at $B=45\mu$), line b (at $B=-65\mu$), the thickness T of a larger value than $50\mu$, and the width W ranging from 1 to $15\mu$.

The optimum relationship of FIG. 6 between the width W of the grooves **20*a* and the thickness T of the fluorescent layer 20 has been obtained by determining the resolution of the input screen relative to said width W with the thickness T of the fluorescent layer 20 used as a parameter. The results of determining the relationship between the width W and thickness T relative to the resolution of the input screen one set forth in FIG. 7, in which the resolution is plotted on the ordinate and the width W is shown on the abscissa. To obtain a desired resolution, the width W of the grooves 20*a* formed in the mosaic surface of the fluorescent layer 20 is preferred to be 9 to $12\mu$, 4 to $7\mu$ and 2 to $5\mu$ when the thickness T of the fluorescent layer 20 is set at $300\mu$, $150\mu$, and $100\mu$ respectively. A smaller thickness T of the fluorescent layer 20 than $50\mu$ is not preferred, because the conversion ratio of X-ray energy into light is decreased. The depth D of the grooves 20a is not governed by the thickness T of the fluorescent layer 20, but is desired to be larger than half the width W of the grooves 20*a***.

Where the grooves **20*a* have a smaller width W than $1\mu$, it is impossible to provide such cracks as can sufficiently separate the columnar blocks 20*b* of the fluorescent layer 20 from each other. Conversely where the grooves 20*a*** have a larger width W than $15\mu$, then a picture produced falls in quality.

With the foregoing embodiments, the fluroescent layer 20 was made of cesium iodide. However, the fluorescent layer 20 amy be formed of any other alkali halide such as potassium iodide. Though not always necessary, a thin layer of alumina or silica disposed between the fluorescent layer 20 and photocathode is effective to prevent the composition of the photocathode from being absorbed or diffused in the fluorescent layer. The thin intermediate layer is preferred to have a thickness ranging between scores of Å units and hundreds of Å units. The photocathode may be prepared from the known photoelectric material such Sb-Cs, Sb-K-Cs or Sb-K-Na-Cs.

Since the aluminium substrate is treated long, in boiling water to provide a mosaic pattern on the surface, the aluminium substrate is protected from intrusion of acids or any other foreign matter. Particularly where a fluorescent layer of alkali halide is thermally deposited on the aluminium substrate 19, the mosaic surface thereof is kept clean and moreover is slightly roughened, thereby enabling said fluorescent layer to be bonded to the aluminium substrate with a greater bonding strength.

What we claim is:

1. An input screen of an image intensifer for converting incident radiation into electrons, comprising an aluminium substrate provided with a mosaic surface prepared by anodizing, sealing process and heat treatment, said mosaic surface including a porous layer of aluminium oxide on said surface formed by said anodizing and sealing process and a large number of narrow grooves and numerous islands defined by said narrow grooves; a fluorescent layer formed on the aluminium oxide layer as crystals and having cracks above the narrow grooves and a large number of columnar blocks defined by the cracks which are arranged substantially parallel with each other; and a photocathode provided on said fluorescent layer.

2. The input screen according to claim 1, wherein a thin barrier layer is provided between the fluorescent layer and photocathode to prevent the composition of the photocathode from being absorbed in the fluorescent layer.

3. The input screen according to claim 2, wherein the thin barrier layer is made of one selected from the group consisting of alumina and silica.

4. The input screen according to claim 1, wherein the fluorescent layer is formed of cesium iodide.

5. An input screen of an image intensifier for converting incident radiation into electrons, comprising an aluminium substrate provided with a mosaic surface, said mosaic surface including a large number of narrow grooves and numerous islands defined by said narrow grooves the width W and depth D of the narrow grooves formed in the mosaic surface of the aluminium substrate and the thickness T of the fluorescent layer having such measurements to satisfy the following equations:

$$T=AW+B$$

$$D\geqq W/2$$

where $A=30$; $-65\mu\leqq B\leqq 45\mu$; $T\geqq 50\mu$; and $1\mu\leqq W\leqq 15\mu$, a fluorescent layer formed on the aluminium and having cracks above the narrow grooves and a large number of columnar blocks defined by the cracks which are arranged substantially parallel with each other; and a photocathode provided on said fluorescent layer.

6. The input screen according to claim 1, wherein a reflection layer is mounted on the mosaic surface of the aluminium substrate which faces the fluorescent layer.

7. The input screen according to claim 1, wherein a light-absorbing layer is formed on the mosaic surface of the aluminium substrate which faces the fluorescent layer.

8. The input screen according to claim 1, wherein the fluorescent layer a barner layer for connecting together the columnar blocks in the proximity of the pl tocathode.

* * * * *